United States Patent [19]
Nakata

[11] Patent Number: 5,724,166
[45] Date of Patent: Mar. 3, 1998

[54] INFORMATION SHARING METHOD FOR A PLURALITY OF NODES IN COMMUNICATION SYSTEM AND COMMUNICATION SYSTEM

[75] Inventor: Toru Nakata, Yokohama, Japan

[73] Assignee: Canon Kabushiki Kaisha, Japan

[21] Appl. No.: 433,054

[22] Filed: May 3, 1995

[30] Foreign Application Priority Data

May 13, 1994 [JP] Japan ................. 6-099824

[51] Int. Cl.$^6$ ................. H04B 10/20; H04J 14/00
[52] U.S. Cl. ................. 359/120; 359/110; 359/125; 370/16
[58] Field of Search ................. 359/110, 120–121, 359/125, 127, 137, 158, 178; 370/57, 16, 50, 54, 14, 85–7

[56] References Cited

U.S. PATENT DOCUMENTS

| | | | |
|---|---|---|---|
| 4,896,934 | 1/1990 | Arthurs et al. | 359/118 |
| 5,172,374 | 12/1992 | De Cristofaris et al. | 359/120 |
| 5,500,857 | 3/1996 | Nakata | 370/50 |

FOREIGN PATENT DOCUMENTS

| | | |
|---|---|---|
| 0294133 | 12/1988 | European Pat. Off. |
| 0573913 | 12/1993 | European Pat. Off. |
| 2224902 | 5/1990 | United Kingdom ............... 359/120 |
| 2241847 | 9/1991 | United Kingdom ............... 359/120 |

OTHER PUBLICATIONS

Computer Comm., vol. 11, No. 6, Dec. 1, 1988, pp. 304–312, J.M. Senior et al., "Performance Investigation of a token passing protocol for a multichannel optical fibre LAN".

IEEE Photonics Technology Let., vol. 5, No. 1, Jan. 1, 1993, pp. 83–85, M.W. Maeda et al., "Wavelength–division multiple–access network based on centralized common–wavelenght control".

NTZ Archiv, Sep. 1988, W. Germany, vol. 10, No. 9, ISSN 0170–172X, pp. 247–257, J. Eberspacher et al., "Ein breitbandiges Lokales Netz mit kombinierter Ring–Stern–Struktur".

Primary Examiner—Kinfe-Michael Negash
Attorney, Agent, or Firm—Fitzpatrick, Cella, Harper & Scinto

[57] ABSTRACT

In a communication system, communication is performed by connecting a plurality of nodes via a signal line. In the system, the same information is shared in the plurality of nodes in accordance with the following manner. Information to be shared is encoded to form an encoded pattern. The encoded pattern is distributed to all the nodes, so that the nodes share the information to be shared by receiving the encoded pattern.

47 Claims, 7 Drawing Sheets

INFORMATION SHARING METHOD FOR A PLURALITY OF NODES IN COMMUNICATION SYSTEM AND COMMUNICATION SYSTEM

BACKGROUND OF THE INVENTION

1. Field of the Invention

The present invention relates to an information sharing method for a communication system constituted by connecting a plurality of nodes via a signal line and, more particularly, to a method of efficiently performing line assignment by sharing a line use condition of the signal line and a communication system using the method.

2. Related Background Art

In recent years, a system which handles large-capacity information such as dynamic image information in a computer network has been examined. For example, a system which is constituted by connecting a plurality of nodes using multiplexed lines such as wavelength multiplexed lines in a star pattern, as shown in FIG. 1, is known.

Figure 1:
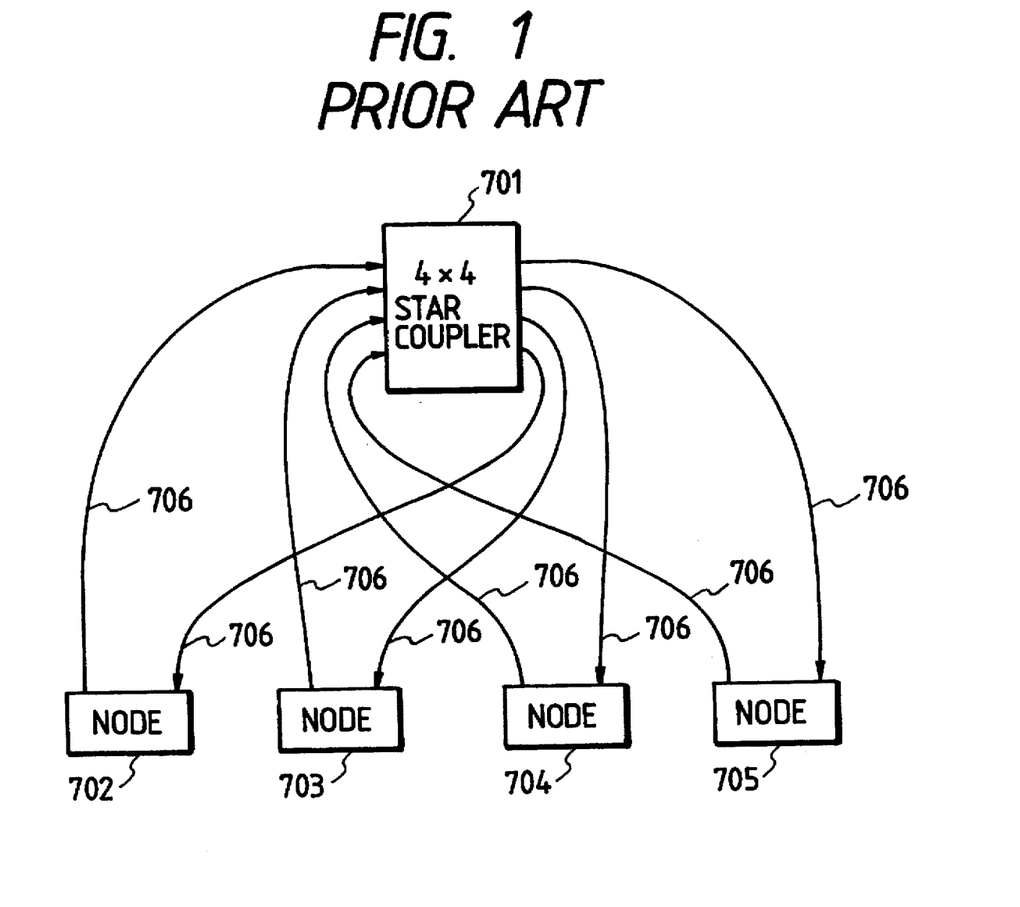
FIG. 1 is a block diagram showing the arrangement of a conventional network.

Referring to FIG. 1, the system includes nodes 702 to 705, wavelength multiplexed lines 706 using optical fibers for connecting these nodes, and a star coupler 701. A signal transmitted from a certain node is input to the star coupler, and is distributed to and received by the respective nodes.

In the above arrangement, in order to attain inter-node communications, each time a communication is started, clock synchronization is achieved by extracting the clock frequency from a transmitted signal by, e.g., PLL (phase-locked loop), or the like, and a signal is received.

However, in this prior art, in order to share the same information, e.g., information associated with the use condition of the multiplexed lines, the use conditions of the nodes on the system, a failure condition on the system, and the like, by all the connected nodes, a node which always acquires information to be shared and always transmits the information must be arranged, thus considerably impairing communication efficiency. For this reason, in general, all the nodes do not always share the same information. For example, as for line assignment of the multiplexed lines, since it is difficult for each node to recognize the use condition of the lines, a single node is used as a control node, and the control node performs centralized control of the multiplexed lines. A node which wants to issue a line use request accesses the control node to request it to assign a line. On the other hand, each node searches for an idle line to transmit a signal, or transmits a signal independently of the use condition of the lines but performs contention assignment.

However, in the method of performing centralized control, the communication procedure becomes undesirably complicated. In the method of searching for all idle lines, means for searching for an idle line must be arranged in each node. In addition, even when the means for searching for an idle line is arranged in each node, a possibility of signal collision remains. In the method of performing contention assignment, a possibility of signal collision on the lines is high, and communication efficiency is impaired.

Since it is difficult to share information, each node cannot recognize the condition of the entire system. For this reason, a signal may be transmitted to a node which is not ready, or a failure which has occurred in a portion of a system cannot often be coped with.

Furthermore, since clock synchronization is performed for each communication, the time required for synchronization is prolonged, resulting in low communication efficiency.

SUMMARY OF THE INVENTION

The present invention has been made in consideration of the above-mentioned problems, and has as its object to share the same information by a plurality of nodes. It is another object of the present invention to remove necessity of clock synchronization for each communication in each node. In order to achieve the above objects, according to the present invention, there are provided the following information sharing method and communication system.

One aspect of the invention resides in an information sharing method in a communication system which performs a communication by connecting a plurality of nodes via a signal line, comprising the steps of:

encoding information to be shared to form an encoded pattern; and distributing the encoded pattern to all the nodes, wherein the nodes share the information to be shared by receiving the encoded pattern.

Another aspect of the invention resides in a communication system which performs a communication by connecting a plurality of nodes via a signal line, comprising:

means for forming an encoded pattern by encoding information to be shared; and means for distributing the encoded pattern to all the nodes, wherein the nodes share the information to be shared by receiving the encoded pattern.

DETAILED DESCRIPTION OF THE PREFERRED EMBODIMENTS

(First Embodiment)

Figure 2:
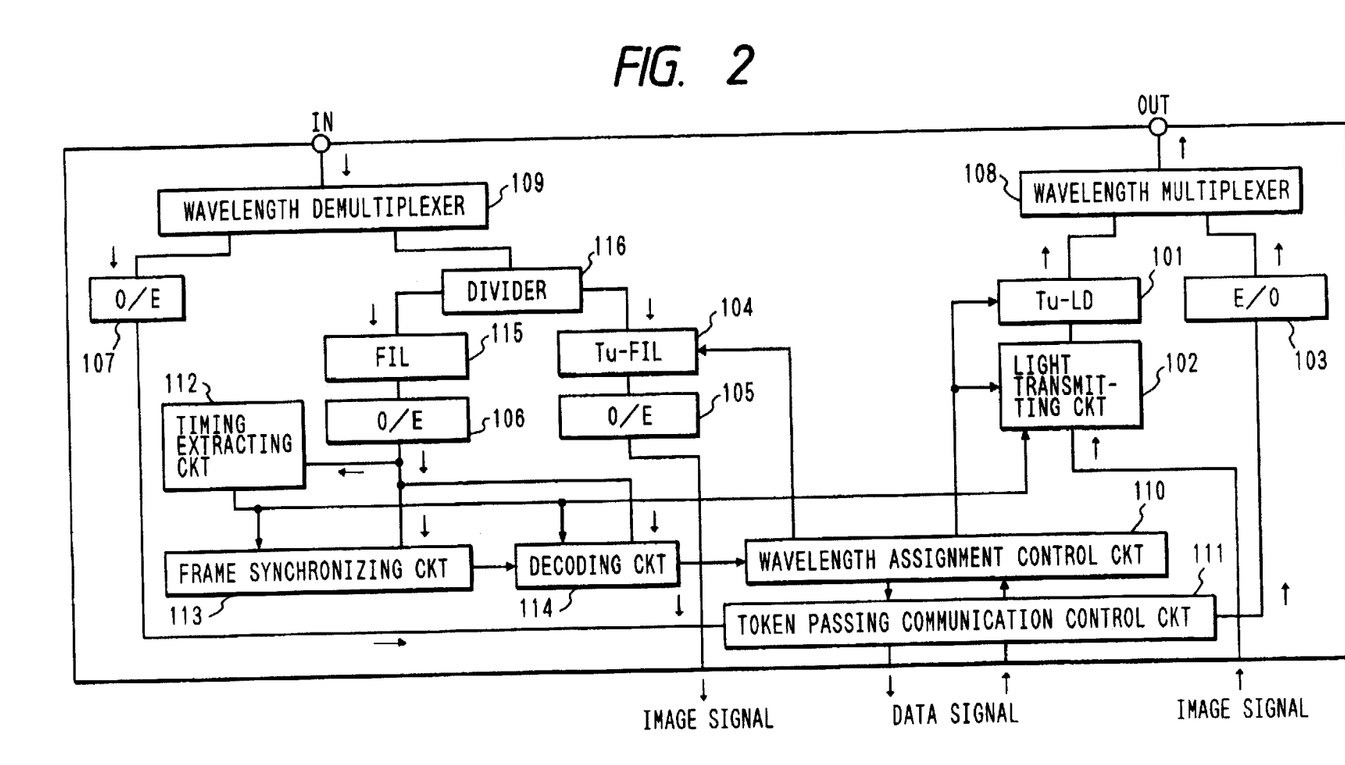
FIG. 2 is a block diagram showing the arrangement of an optical node according to the first embodiment of the present invention.
Figure 3:
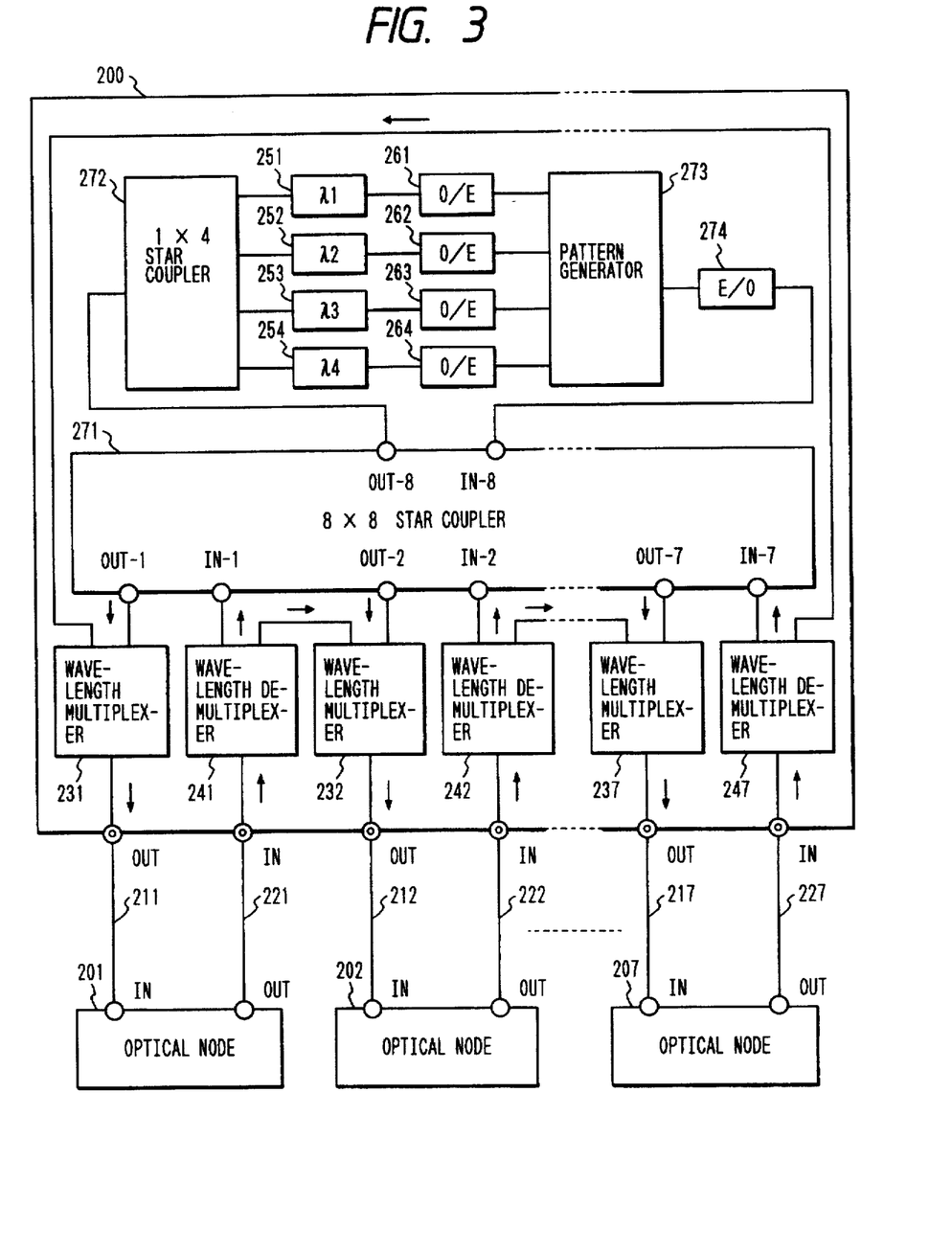
FIG. 3 is a block diagram showing the arrangement of a network of the first embodiment.

FIGS. 2 and 3, and Table 1 are diagrams and a table showing the first embodiment of the present invention. FIG. 2 shows the arrangement of an optical node, FIG. 3 shows the arrangement of a network, and Table 1 shows the output patterns of a pattern generator.

The arrangements of the optical node and the network of this embodiment will be explained below. Referring to FIGS. 2 and 3, a tunable laser diode (Tu-LD) 101 outputs an optical signal of an arbitrary wavelength. A light transmitting circuit 102 drives the tunable laser diode 101 to convert an input signal into an optical signal. E/O converters 103 and 274 each convert an electrical signal into an optical signal.

A tunable wavelength filter (Tu-FIL) 104 extracts an optical signal of an arbitrary wavelength from optical signals of a plurality of wavelengths. O/E converters 105 to 107 and 261 to 264 each convert an optical signal into an electrical signal. Wavelength multiplexers 108 and 231 to 237 each multiplex optical signals in two wavelength ranges. Wavelength demultiplexers 109 and 241 to 247 each demultiplex optical signals in two wavelength ranges. A wavelength assignment control circuit 110 manages the communication wavelengths of wavelength multiplexed lines. The circuit 110 is connected to a token passing communication control circuit 111. A timing extracting circuit 112 extracts a clock component of an input signal. A frame synchronizing circuit 113 extracts a frame pulse of an input signal. A decoding circuit 114 decodes an encoded signal. Filters 115 and 251 to 254 each transmit an optical signal of a specific wavelength therethrough. The filter 115 is connected to a divider 116. A concentrator 200 connects the respective optical nodes to perform a communication. Optical nodes 201 to 207 each having the arrangement shown in FIG. 2 are connected to the concentrator 200. Down optical fiber transmission paths 211 to 217 and up optical fiber transmission paths 221 to 227 are connected to the optical nodes 201 to 207. An 8×8 star coupler 271 is connected to a 1×4 start coupler 272 and a pattern generator 273 for generating an arbitrary pattern. The tunable wavelength filter 104 is an element or device which can vary the transmission wavelength, and may adopt a fiber Fabry-Pérot filter or the like. The tunable laser diode 101 is an element or device which can vary the oscillation wavelength based on the value of a current to be supplied to a wavelength control element, and may utilize a DFB laser or a DBR laser. The wavelength multiplexers 108 and 231 to 237, and the wavelength demultiplexers 109 and 231 to 237 respectively multiplex and demultiplex optical signals in two wavelength ranges. In this embodiment, a wavelength $\lambda_a$ is used as the first wavelength range, and wavelengths $\lambda_0$ to $\lambda_4$ are used as the second wavelength range.

The network of this embodiment has an arrangement obtained by combining a token passing ring type loop network using $\lambda_a$ as the first wavelength range, and a broadcast type star network using $\lambda_0$ to $\lambda_4$ as the second wavelength range by the wavelength multiplex technique, and the optical nodes are connected to the concentrator in a star pattern. On the loop transmission path, a node, which acquires the single token on the network, obtains the right of transmission and performs a communication. On the star transmission paths, a node acquires the right of use of a certain wavelength, and uses the wavelength to perform communication without causing any signal collision. Each of the optical nodes connected to the network has communication control circuits for both the systems, and performs a communication by selecting a transmission path suitable for the type of a signal input thereto. For example, a signal supplied from a computer apparatus connected to each optical node is transmitted via the loop transmission path which is suitable for transmitting information with a small data size at high speed, and a signal supplied from a video apparatus connected to each optical node is transmitted via the star transmission paths which are suitable for transmitting long-time data to many users.

The line assignment method in this network uses the token passing method on the loop line, and the line assignment (wavelength assignment) method of the present invention on the star lines.

The wavelength assignment method of a star communication circuit of this embodiment will be explained below with reference to FIGS. 2 and 3 and Table 1. In this method, information of wavelengths used on the star lines is expressed by a code pattern having a predetermined bit length, the concentrator 200 assigns the frequency components of the lines and repetitively transmits the pattern to the respective nodes, and each node selects an idle wavelength based on the received information. Table 1 shows an example of code patterns corresponding to the use conditions of the wavelengths, and exemplifies a case wherein the number of wavelengths is 4 and the number of repetitive bits is 8. In this code pattern, 7 bits after the frame bit are changed in correspondence with the use condition of the wavelengths. Each pattern is defined by an RZ pattern having a clock component, so that each node can extract a clock based on this signal, and patterns with a small number of "0"s are selected. The pattern is generated by the pattern generator 273 in the concentrator 200. More specifically, wavelength multiplexed light input to the concentrator 200 is detected by the O/E converters 261 to 264, and the pattern to be generated is changed in correspondence with the detection results. The pattern output from the pattern generator 273 (assume that the first pattern in Table 1 is output) is converted into an optical signal of the wavelength $\lambda_0$ by the E/O converter 274. The optical signal is input to the IN-8 port of the 8×8 star coupler 271, and is then distributed to all the output ports of the coupler 271 (the optical signal is multiplexed with an optical signal of a wavelength used by each star line). The optical signal of the wavelength $\lambda_0$ output from an output port OUT-1 is multiplexed with an optical signal of the wavelength $\lambda_a$ of the loop line by the wavelength multiplexer 231, and the multiplexed signal is output onto the optical fiber transmission path 211. The optical signal of the wavelength $\lambda_0$ which is input to the optical node 201 via the path 201 is demultiplexed from the optical signal of the wavelength $\lambda_a$ by the wavelength demultiplexer 109, and is divided into two signals by the divider 116. The divided signals are respectively input to the tunable filter 104 and the $\lambda_0$ transmission filter 115. The optical signal of the wavelength $\lambda_0$ input to the filter 104 is lost there, but only the optical signal of the wavelength $\lambda_0$ input to the filter 115 is transmitted through the filter 115 and is converted into an electrical signal as a received signal by the O/E converter 106. The signal output from the converter 106 is input to the timing extracting circuit 112, the frame synchronizing circuit 113, and the decoding circuit 114. The timing extracting circuit 112 extracts a timing component from the input signal to generate a clock signal, and supplies the clock signal to the frame synchronizing circuit 113, the decoding circuit 114, and the light transmitting circuit 102. The frame synchronizing circuit 113 achieves frame synchronization of the pattern signal, and supplies a frame position pulse to the decoding circuit 114. The decoding circuit 114 decodes the encoded pattern, and informs the use wavelength information of the star lines to the wavelength assignment control circuit 110. The circuit 110 updates the wavelength table on the basis of the information supplied from the decoding circuit. In this manner, the optical node can detect idle wavelengths of the star lines. Similarly, other optical nodes can detect the wavelength use condition of the star lines on the basis of the pattern signal from the concentrator 200.

TABLE 1

Code Pattern

| Pattern No. | $\lambda_1$ | $\lambda_2$ | $\lambda_3$ | $\lambda_4$ | Code Pattern |
|---|---|---|---|---|---|
| 1  | 0 | 0 | 0 | 0 | F 1 1 1 1 1 1 1 |
| 2  | 0 | 0 | 0 | 1 | F 1 1 1 1 1 1 0 |
| 3  | 0 | 0 | 1 | 0 | F 1 1 1 1 1 0 1 |
| 4  | 0 | 0 | 1 | 1 | F 1 1 1 1 0 1 1 |
| 5  | 0 | 1 | 0 | 0 | F 1 1 1 0 1 1 1 |
| 6  | 0 | 1 | 0 | 1 | F 1 1 0 1 1 1 1 |
| 7  | 0 | 1 | 1 | 0 | F 1 0 1 1 1 1 1 |
| 8  | 0 | 1 | 1 | 1 | F 0 1 1 1 1 1 1 |
| 9  | 1 | 0 | 0 | 0 | F 1 1 1 0 1 1 0 |
| 10 | 1 | 0 | 0 | 1 | F 1 1 0 1 1 0 1 |
| 11 | 1 | 0 | 1 | 0 | F 1 0 1 1 0 1 1 |
| 12 | 1 | 0 | 1 | 1 | F 0 1 1 0 1 1 1 |
| 13 | 1 | 1 | 0 | 0 | F 1 1 0 1 1 1 0 |
| 14 | 1 | 1 | 0 | 1 | F 1 0 1 1 1 0 1 |
| 15 | 1 | 1 | 1 | 0 | F 0 1 1 1 0 1 1 |
| 16 | 1 | 1 | 1 | 1 | F 1 0 1 1 1 0 1 |

When a video apparatus connected to the optical node 201 issues a transmission request of an image signal, the optical node 201 controls to select an idle wavelength from the wavelength table stored in the wavelength assignment control circuit 110 (assume that it selects the wavelength $\lambda_2$), and to set the tunable LD 101 to be the wavelength $\lambda_2$. When the wavelength of the LD 101 is set, the wavelength assignment control circuit 110 controls the light transmitting circuit 102 to start transmission of the image signal. The circuit 102 outputs the image signal in synchronism with the clock from the timing extracting circuit 112. The output image signal is converted into an optical signal of the wavelength $\lambda_2$ by the tunable LD 101, and is multiplexed with an optical signal of the wavelength $\lambda_a$ from the E/O converter 103 by the wavelength multiplexer 108. The multiplexed signal is output onto the optical fiber transmission path 221. The image signal input to the concentrator 200 via the path 221 is demultiplexed from the optical signal of the wavelength $\lambda_a$ by the wavelength demultiplexer 241. The demultiplexed signal is input to the 8×8 star coupler 271 and is distributed to all the output ports. The image signal output from an output port OUT-8 is input to the 1×4 star coupler 272, and is distributed to four ports. The distributed signals are respectively input to the filters 251 to 254. In this case, since the image signal has the wavelength $\lambda_2$, it is transmitted through only the filter 252, and is converted into an electrical signal as a received signal by the O/E converter 262. The pattern generator 273 recognizes that the optical signal of the wavelength $\lambda_2$ is used on the star lines, and changes its output pattern to the fifth pattern in Table 1. The signal representing this pattern is distributed to the respective optical nodes, as described above. Each node detects that the optical signal of the wavelength $\lambda_2$ is used, and selects a wavelength other than the wavelength $\lambda_2$ to perform a communication. As described above, the wavelength assignment method in which each optical node receives a signal encoded with wavelength information and selects an idle wavelength is used.

The communication operation of this network will be described below. A communication operation executed when an image signal is to be transmitted from the node 201 to the node 202 will be exemplified below. The node 201 selects an idle wavelength using the above-mentioned wavelength assignment method so as to acquire the right of transmission on the star lines and to perform wavelength assignment. In this case, assume that an optical node which received a token performs wavelength assignment and acquires the right of transmission, since another node may perform wavelength assignment and select the same wavelength at the same time. The optical node 201 acquires the token from the token passing type communication line. In the token passing system, a signal called a token which gives the right of transmission of data circulates on the network, a node which received the token sends a packet signal including a destination node address and data onto the transmission line, and each node receives the signal to perform a communication if the destination address indicates the node. The token circulates the loop network at the wavelength $\lambda_a$ while being regenerated and relayed by the respective nodes. In the network of this embodiment, the token output from the token passing communication control circuit 111 of the optical node 201 is converted into an optical signal of the wavelength $\lambda_a$ by the E/O converter 102. The optical signal is multiplexed with an optical signal output from the Tu-LD 101 by the wavelength multiplexer 108, and the multiplexed signal is output onto the optical fiber transmission path 221. The token transmitted through the path 221 is input to the concentrator 200, and is demultiplexed from the optical signal output from the Tu-LD 101 by the wavelength demultiplexer 241. The token is then input to the wavelength multiplexer 232. The wavelength multiplexer 232 multiplexes the token with wavelength multiplexed light of the star lines, and sends the multiplexed signal onto the optical fiber transmission path 212. The token transmitted through the path 212 is input to the optical node 202, and is demultiplexed from the wavelength multiplexed light by the wavelength demultiplexer 109. The token is then converted into an electrical signal by the O/E converter 107, and is input to the token passing communication control circuit 111. Thereafter, the token is sequentially transferred to the neighboring optical nodes, and circulates the line from the optical node 207 to the optical node 201. In this manner, the token circulates the loop line, and is not simultaneously input to more than one node. When the token passing communication control circuit 111 of the optical node 201 receives the token, the optical node 201 acquires the right of use of the star lines, and informs the reception of the token to the wavelength assignment control circuit 110 to perform wavelength assignment. The circuit 110 selects an idle wavelength, which is not used, from the wavelength table stored therein, and sets the oscillation wavelength of the tunable LD to be the selected wavelength. The LD 101 receives a current from the wavelength assignment control circuit 110 at its wavelength control terminal, so that the oscillation center wavelength is set to be, e.g., the wavelength $\lambda_2$. Furthermore, the wavelength assignment control circuit 110 informs information of the selected wavelength $\lambda_2$ to the token passing communication control circuit 111 so as to inform wavelength information to the node 202. Then, the wavelength information is converted into an optical signal of the wavelength $\lambda_a$ by the E/O converter 103 together with the address of the node 201, the destination address, and the token, and the converted signal is output. The output signal is input to the optical node 202 along the same route as that of the token described above, and is read by the communication control circuit 111. The circuit 111 fetches the signal addressed to its own node by detecting the destination address of the input signal, and informs the read wavelength information $\lambda_2$ to the wavelength assignment control circuit 110. The circuit 110 controls the tunable filter 104 to set its reception wavelength to be $\lambda_2$. When the filter is set, information for instructing the start of transmission is sent to the optical node 201 using the token passing communication line. When the token passing communication control circuit 111 of the optical node 201 receives the data, the circuit 111 instructs the video apparatus connected to the node 201 to start transmission. The wavelength assignment control circuit 110 controls the light transmitting circuit 102 to input an image signal to the tunable LD 101, thereby converting the image signal into an optical signal of the wavelength $\lambda_2$. The converted signal is output onto the up optical fiber transmission path 221. The image signal is input to the concentrator 200 via the path 221, and is demultiplexed from an optical signal of the wavelength $\lambda_a$ by the wavelength demultiplexer 241. The image signal is then distributed by the 8×8 star coupler 271. The distributed optical signals are output onto the down optical fiber transmission paths via the corresponding wavelength multiplexers, and are input to all the nodes. The image signal input to the node 202 is demultiplexed from the optical signal of the wavelength $\lambda_a$ by the wavelength demultiplexer 109, and is divided into two signals by the divider 116. Then, one of the divided signals is incident on the incident surface of the tunable filter 104. Since the center wavelength of the filter 104 has already been set to be $\lambda_2$, the image signal is transmitted through the filter 104, and is converted into an electrical signal as a received signal by the O/E converter 105. The image signal input to other nodes is lost without being received since the wavelength of the tunable filter is not set. In this manner, a communication from the node 201 to the node 202 is attained. The above-mentioned communication operation is similarly performed between other nodes.

In this embodiment, the star lines and the loop line are multiplexed on a signal transmission path by multiplexing the wavelengths, but may use different transmission paths. As the communication method of the loop line, the token passing method has been exemplified. However, other loop communication methods may be used. The patterns to be output from the pattern generator are not limited to those shown in Table 1.

(Second Embodiment)

Figure 4:
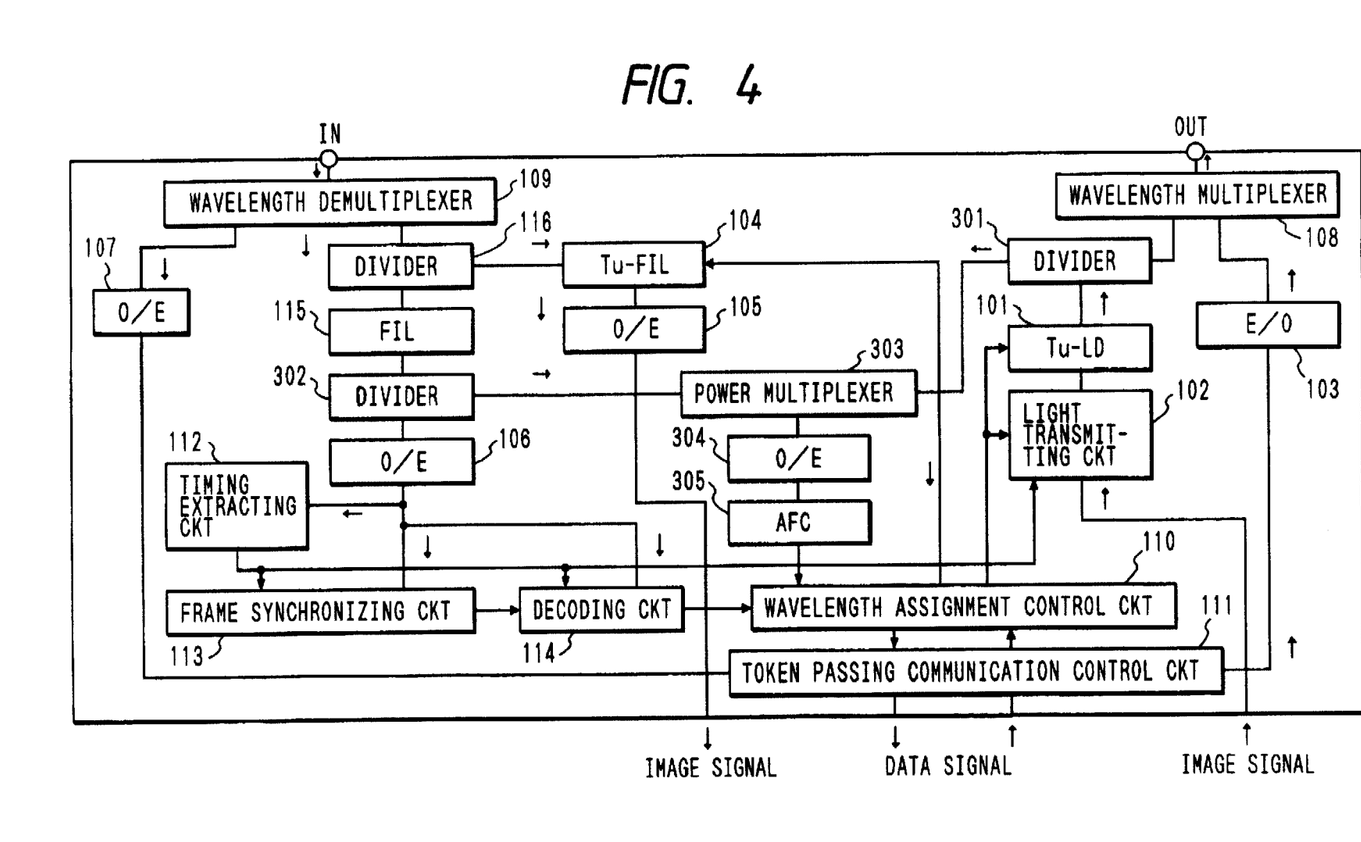
FIG. 4 is a block diagram showing the arrangement of an optical node according to the second embodiment of the present invention.

The second embodiment of the present invention will be described below. The network arrangement is the same as that in the first embodiment, and an optical node shown in FIG. 4 is used. Referring to FIG. 4, the optical node includes dividers 301 and 302, a power multiplexer 303, an O/E converter 304, and an automatic frequency control (AFC) circuit 305. In FIG. 4, the same reference numerals denote the same parts as in the first embodiment.

In the second embodiment, the pattern signal described in the first embodiment is used not only for distribution of wavelength information and a clock but also for wavelength tuning, and other communication operations are the same as those in the first embodiment. The wavelength tuning operation will be described below. A pattern signal serving as a wavelength reference is distributed as optical signals of the wavelength $\lambda_0$ from the concentrator 200 to the respective optical nodes, as has been described in the first embodiment. The pattern signal input to each node is demultiplexed from an optical signal of the wavelength $\lambda_a$ by the wavelength demultiplexer 109, and is divided into two signals by the divider 116. One of the two divided pattern signals is lost at the Tu-FIL 104. The other pattern signal is demultiplexed from other wavelength multiplexed signals by the filter 115, and only the pattern signal is transmitted through the filter 115. The pattern signal is divided into two signals by the divider 302, and one of the divided signals is input to the O/E converter 106. The other divided signal is input to the power multiplexer 303. From the pattern signal input to the converter 106, a clock is extracted, as has been described in the first embodiment, thus achieving detection of wavelength information and node synchronization. The pattern signal input to the power multiplexer 303 is multiplexed with an optical signal obtained by dividing an optical signal output from the Tu-LD 101 into two signals by the divider 301. The multiplexed two signals are converted into an electrical signal by the O/E converter 304. The O/E converter 304 generates a beat signal corresponding to the wavelength difference between the two optical signals at its output terminal, and the AFC circuit 305 informs the difference between the beat signal frequency and a predetermined frequency to the wavelength assignment control circuit 110. The circuit 110 supplies a current to the wavelength control terminal of the Tu-LD 101 to control the oscillation wavelength, so that the beat signal frequency becomes the predetermined frequency. In this manner, the oscillation wavelength of the Tu-LD 101 is controlled to always have a predetermined wavelength difference from the wavelength of the pattern signal. This control is performed in each node, and the transmission wavelength of each node is stabilized using the pattern signal as a reference wavelength.

(Third Embodiment)

Figure 5:
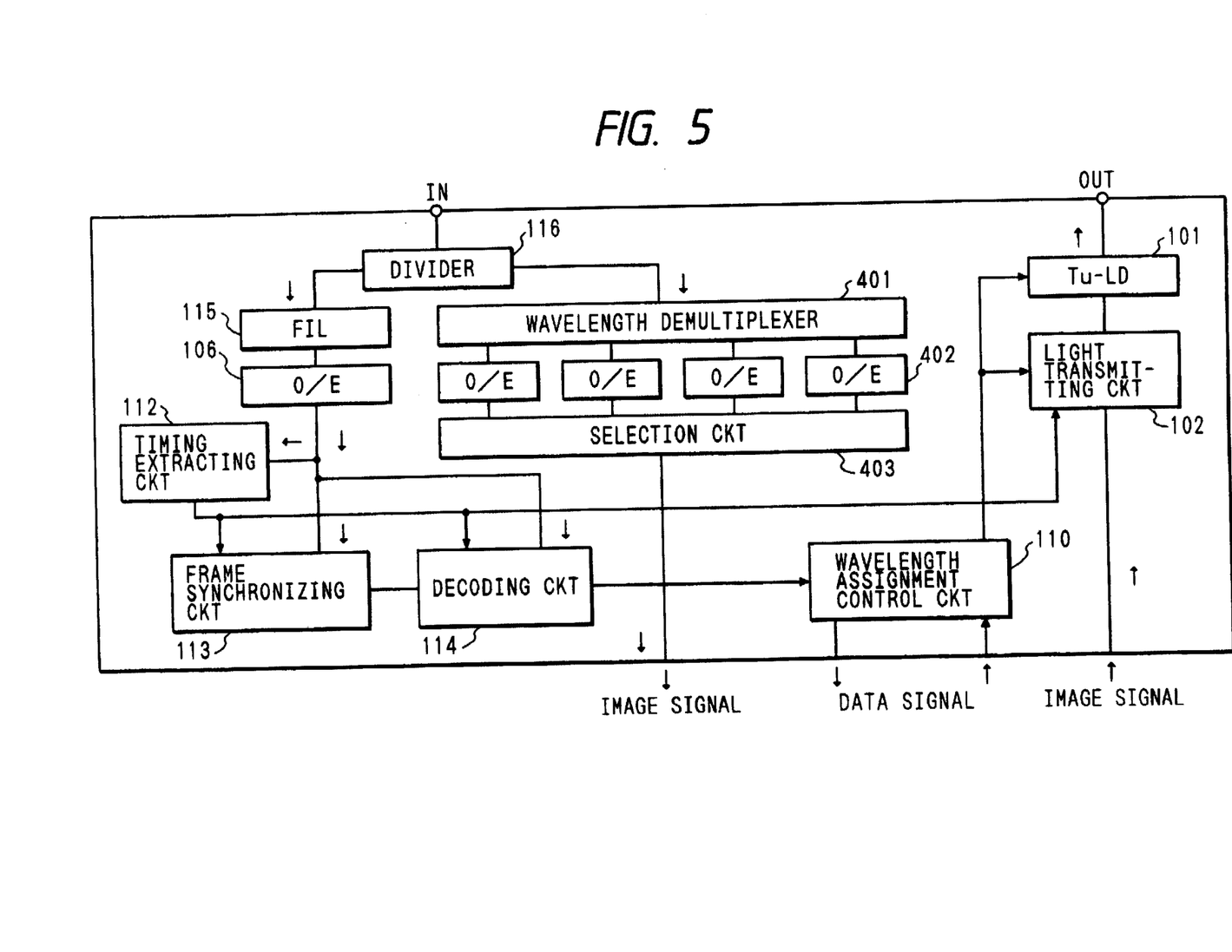
FIG. 5 is a block diagram showing the arrangement of an optical node according to the third embodiment of the present invention.
Figure 6:
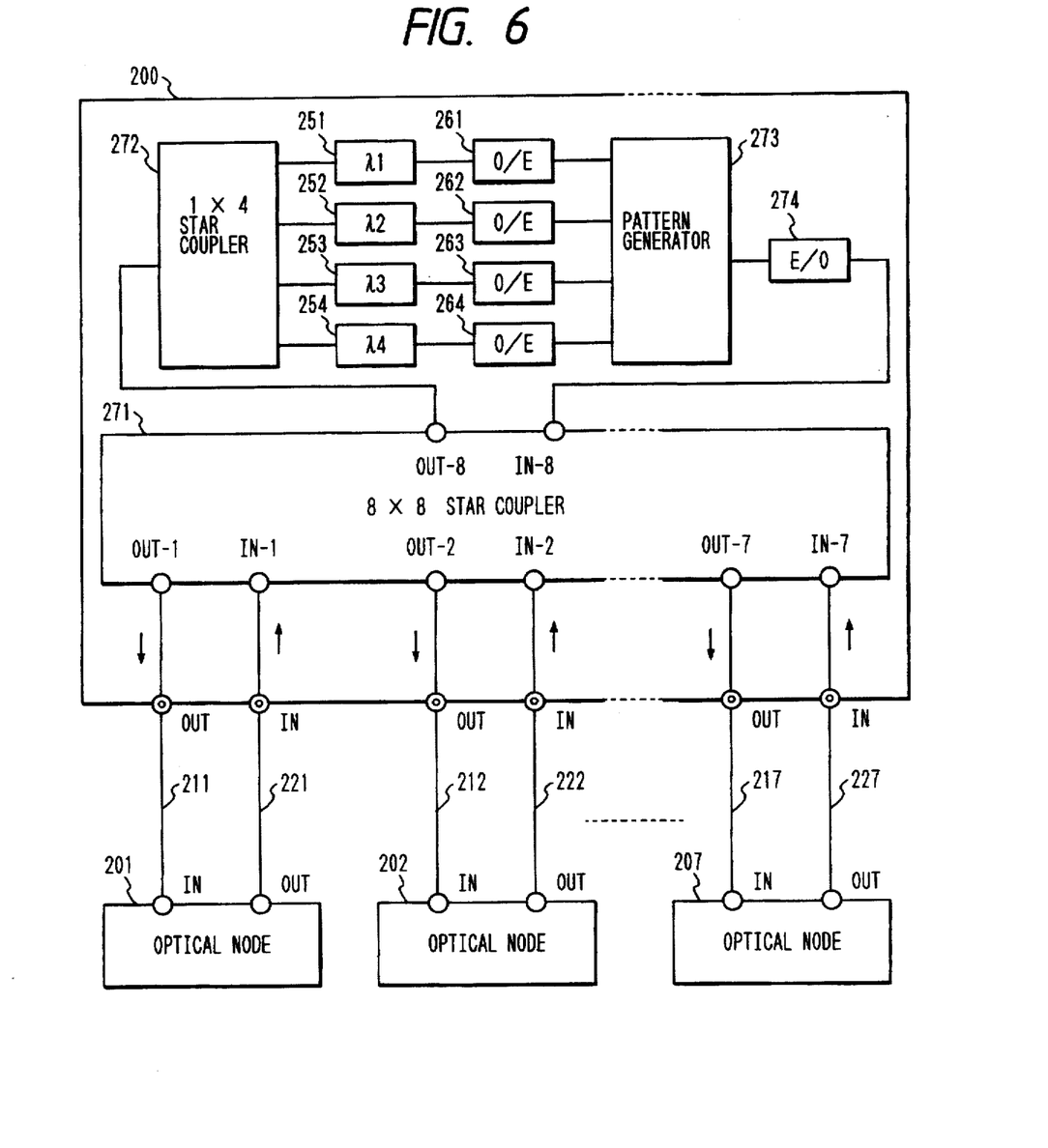
FIG. 6 is a block diagram showing the arrangement of a network of the third embodiment.

In the first and second embodiments, the arrangement as a combination of the star lines and the loop line has been exemplified. However, the line assignment method of the present invention is not limited to this arrangement. For example, an arrangement obtained by removing the loop line from the arrangement of the first embodiment may be adopted. FIGS. 5 and 6 show this arrangement. In this case, the use condition of the star lines is recognized, the respective nodes share information of the use condition and achieve clock synchronization based on this information in the same manner as in the first and second embodiments. However, in this embodiment, since there is no means for giving the right of selection of an idle line to each node (this means corresponds to the token in the first and second embodiments), a node which wants to use a line immediately starts transmission if it finds an idle line. At this time, a plurality of nodes may select this line at the same time, and a signal collision may occur. However, the possibility of a signal collision is very low since the line use condition is sequentially updated within a very short period of time. Each node may have a function of performing collision detection to perform re-send control, or the O/E converters 261 to 264 may have a function of performing collision detection, and collision information may be distributed as an encoded pattern from the pattern generator to the respective nodes to perform re-send control.

In this embodiment, since there is no means for instructing a line (wavelength) to be used for reception to a destination node of a signal, each node demultiplexes all the wavelengths using a wavelength demultiplexer 401, monitors the wavelengths by O/E converters 402, and picks up a signal addressed to its own node using a selection circuit 403. In place of the wavelength demultiplexer, a combination of a divider and a wavelength filter may be used. On the other hand, when the pattern generator 273 fetches information of the wavelength to be received by a destination node, which information is not shared by all the nodes, adds the encoded pattern of this information to the encoded pattern of the idle line information, and outputs the sum information from the star coupler, each node need not monitor all the wavelengths, and can control the same tunable filter as the tunable filter 104 in FIG. 2 in accordance with the information of the wavelength to be received so as to receive data.

(Fourth Embodiment)

Figure 7:
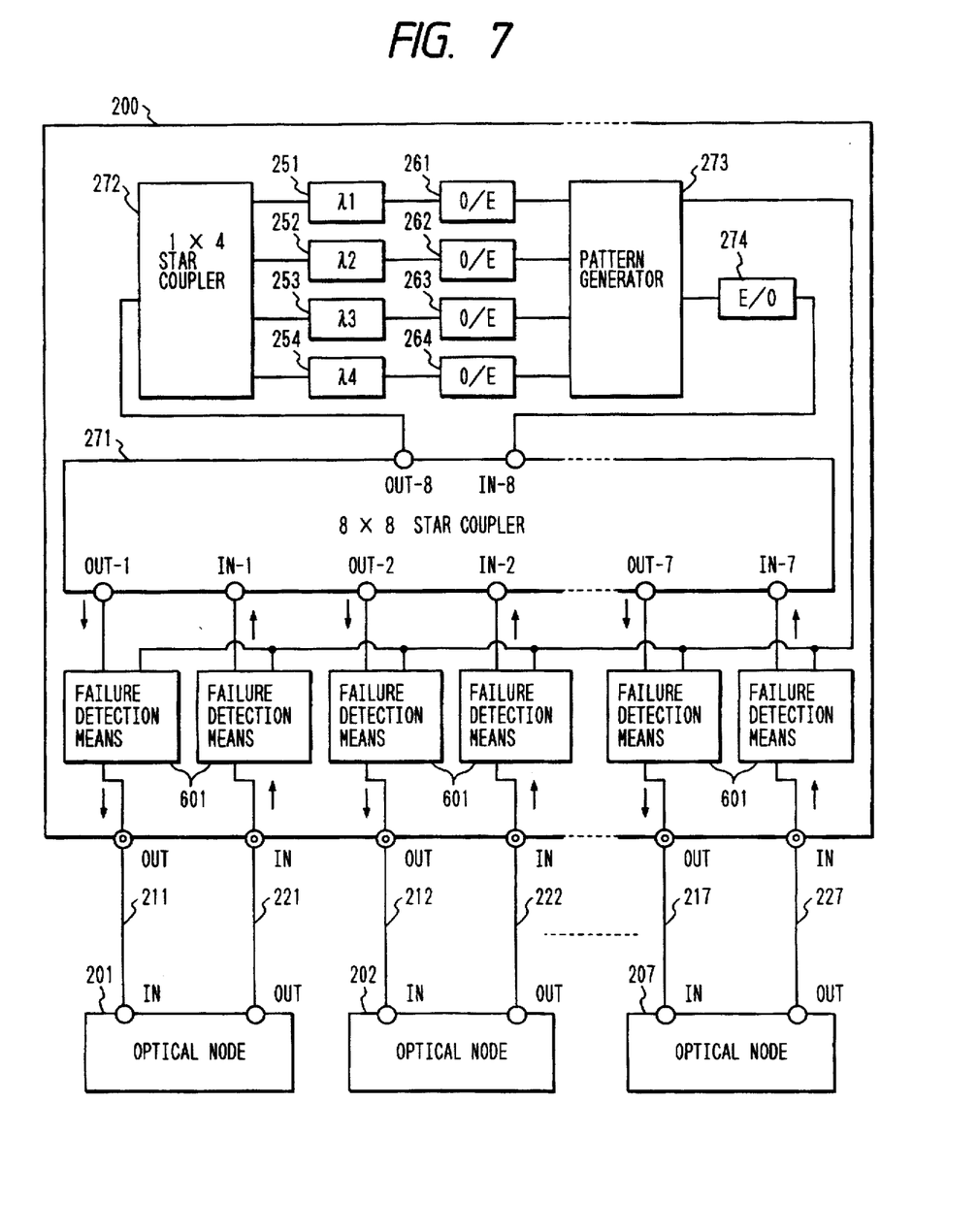
FIG. 7 is a block diagram showing the arrangement of a network with failure detection means.

In the first to third embodiments, information, which is sent to and shared by the respective nodes as a repetitive code pattern, indicates the use condition of multiplexed lines. However, the present invention is not limited to this. For example, each node outputs a predetermined signal upon activation of the system, and the pattern generator determines that only nodes from which the predetermined signals have been transmitted are activated, and nodes from which the predetermined signals are not transmitted are not activated or suffer some failures. The pattern generator encodes information indicating the states of the nodes into a repetitive pattern, and outputs the encoded pattern at a clock frequency. Then, all the nodes can detect the activation state of the system, thus improving communication efficiency. On the other hand, failure detection means 601 may be arranged on the optical fibers, the generation condition of failures may be expressed by a repetitive pattern, and this information may be shared by all the nodes. As the failure detection means, a method of detecting a change in amount of light at a failure position may be used, as shown in FIG. 7.

In each of the above embodiments, the use condition of the lines, the activation condition of the system, or the generation condition of failures is encoded into a repetitive pattern. However, these conditions may be combined.

The information sharing method and line assignment method of the present invention are not limited to the star lines, but may be used in a bus or loop topology. However, the method of the present invention is particularly suitably used in the star lines. When the pattern generator is arranged in the vicinity of the star coupler, acquisition and distribution of information to be shared are facilitated, and all the nodes can receive the encoded pattern with the same contents at almost the same time although a slight difference is generated depending on the lengths of the respective transmission paths. In addition, any transmission loss upon transmission of the encoded pattern can be reduced.

As described above, according to the present invention, all the nodes in the communication system can share the same information, and the information to be shared can be sequentially updated within a very short period of time. Furthermore, each node can maintain a state wherein clock synchronization is always achieved. Since the information can be shared, distribution processing can be realized in, e.g., line assignment, and the communication procedure is simplified. In addition, since clock synchronization is always achieved, high communication efficiency can be realized. When information associated with the activation condition of the system, generation condition of failures, and the like is shared, wasteful communications can be eliminated, and communication efficiency can be improved.

What is claimed is:

1. A communication method in a communication system in which a plurality of nodes are respectively connected to each other, by a plurality of signal lines and by a usage state transmission line on which information indicative of a usage state of the plurality of signal lines is transmitted, to perform communication via a star coupler to which the signal lines and the usage state transmission line are connected, said method comprising the steps of:

forming an encoded pattern in which state information indicative of a current usage state of the plurality of signal lines is encoded; and distributing the encoded pattern directly to each of the nodes over the usage state transmission line via the star coupler, wherein after a node requesting use of a signal line receives the encoded pattern, the requesting node selects an available signal line on the basis of the state information.

2. A method according to claim 1, wherein the encoded pattern is distributed to the respective nodes at a clock frequency used in communication performed on the signal line.

3. A method according to claim 1, wherein said encoding step forms the encoded pattern to further encode information indicative of an activation state of the communication system.

4. A method according to claim 1, wherein said encoding step forms the encoded pattern to further encode an obstacle occurrence state in the communication system.

5. A method according to claim 1, wherein the plurality of signal lines and the usage state transmission line are multiplexed.

6. A method according to claim 1, wherein the plurality of signal lines and the usage state transmission line are wavelength-multiplexed.

7. A method according to claim 1, wherein the plurality of signal lines are wavelength-multiplexed, and the encoded pattern is distributed to the respective nodes at a reference wavelength in the communication system so that communication wavelengths are stabilized in the respective nodes on the basis of the reference wavelength.

8. A method according to claim 1, wherein the requesting node selects a signal line which is not occupied on the basis of the state information when a line selecting right is given to the requesting node.

9. A communication system comprising:

a plurality of nodes;

a plurality of signal lines for connecting said nodes to perform communication;

a usage state transmission line on which state information indicative of a usage state of the plurality of signal lines is transmitted to the respective nodes;

forming means for forming an encoded pattern in which the state information is encoded; and distributing means for distributing the encoded pattern directly to the respective nodes via said usage state transmission lines, said distributing means including a star coupler to which said signal lines and said usage state transmission line are connected, wherein after a node requesting use of a signal line receives the encoded pattern, the requesting node selects an available signal line on the basis of the state information.

10. A system according to claim 9, wherein said distributing means distributes the encoded pattern to the respective nodes at a clock frequency used in communication performed on the signal line.

11. A system according to claim 9, further comprising means for detecting signals on the plurality of signal lines to collect the state information.

12. A system according to claim 9, wherein the plurality of signal lines and said usage state transmission line are multiplexed.

13. A system according to claim 9, wherein the plurality of signal liens and said usage state transmission line are wavelength-multiplexed.

14. A system according to claim 9, further comprising a line on which a token is circulated to the plurality of nodes, wherein when the requesting node acquires the token, a line selecting right is given to the requesting node.

15. A communication method in a communication system in which a plurality of nodes are connected, by a plurality of signal lines and by a usage state transmission line on which information indicative of a usage state of the plurality of signal lines is transmitted, to perform communication, said method comprising the steps of:

forming an encoded pattern in which state information indicative of a current usage state of the plurality of signal lines is encoded; and transmitting the encoded pattern to each of the nodes at a clock frequency used in communication performed on the signal line over the usage state transmission line, wherein each of the nodes obtains the state information upon receiving the encoded pattern, and after a node requesting use of a signal line receives the encoded pattern, the requesting node selects an available signal line of the basis of the state information.

16. A method according to claim 15, wherein the communication system has a star type structure in which the signal lines and the usage state transmission line are respectively connected to a star coupler.

17. A method according to claim 16, wherein said transmitting step is performed by supplying the encoded pattern to the star coupler and distributing the encoded pattern to each of the nodes via the star coupler.

18. A method according to claim 15, wherein said encoding step forms the encoded pattern to further encode information indicative of an activation state of the communication system.

19. A method according to claim 15, wherein said encoding step forms the encoded pattern to further encode an obstacle occurrence state in the communication system.

20. A method according to claim 15, wherein the plurality of signal lines and the usage state transmission line are multiplexed.

21. A method according to claim 15, wherein the plurality of signal line and the usage state transmission line are wavelength-multiplexed.

22. A method according to claim 15, wherein the plurality of signal lines our wavelength-multiplexed, and the encoded pattern is transmitted to the respective nodes at a reference wavelength in the communication system so that communication wavelengths are stabilized in the respective nodes on the basis of the reference wavelength.

23. A method according to claim 15, wherein the requesting node selects a signal line, which is not occupied, on the basis of the state information when a line selecting right is given to the requesting node.

24. A communication system comprising:
a plurality of nodes;
a plurality of signal lines for connecting said odes to perform communication;
a usage state transmission line on which state information indicative of a usage state of the plurality of signal lines is transmitted to the respective nodes;
forming means for forming an encoded pattern in which the state information is encoded; and
transmitting means for transmitting the encoded pattern to the respective nodes at a clock frequency used in communication performed on the signal line via said usage state transmission line;
wherein each of the nodes obtains the state information upon receiving the encoded pattern, and after a node requesting use of a signal line receives the encoded pattern, the requesting node selects an available signalling on the basis of the state information.

25. A system according to claim 24, further comprising means for detecting signals on the plurality of signal lines to collect the state information.

26. A system according to claim 24, wherein said transmitting means includes star coupler, and the communication system has a star type structure in which the signal lines and the usage state transmission line are respectively connected to said star coupler.

27. A system according to claim 24, wherein the plurality of signal lines and said usage state transmission line are multiplexed.

28. A system according to claim 24, wherein the plurality of signal lines and said usage state transmission line are wavelength-multiplexed.

29. A system according to claim 24, further comprising a line on which a token is circulated to the plurality of nodes, wherein when the requesting node acquires the token, a line selecting right is given to the requesting node.

30. A communication method in a communication system in which a plurality of nodes are connected, by a plurality of signal lines and by a usage state transmission line on which information indicative of a usage state of the plurality of signal lines is transmitted, to perform communication, said method comprising the steps of:

forming an encoded pattern in which state information indicative of a current usage state of the plurality of signal lines and an obstacle occurrence state in the communication system are encoded; and transmitting the encoded pattern to each of the nodes over the usage state transmission line, wherein each of the nodes obtains the state information upon receiving the encoded pattern, and after a node requesting use of a signal line receives the encoded pattern, the requesting node selects an available signal line of the basis of the state information.

31. A method according to claim 30, wherein the communication system has a star type structure in which the signal lines and the usage state transmission line are respectively connected to a star coupler.

32. A method according to claim 31, wherein said transmitting step is performed by supplying the encoded pattern to the star coupler and distributing the encoded pattern to each of the nodes via the star coupler.

33. A method according to claim 30, wherein the encoded pattern is transmitted to the respective nodes at a clock frequency used in communication performed on the signal line.

34. A method according to claim 30, wherein said encoding step forms the encoded pattern to further encode information indicative of an activation state of the communication system.

35. A method according to claim 30, wherein the plurality of signal lines and the usage state transmission line are multiplexed.

36. A method according to claim 30, wherein the plurality of signal lines and the usage state transmission line are wavelength-multiplexed.

37. A method according to claim 30, wherein the plurality of signal lines are wavelength-multiplexed and the encoded pattern is transmitted to the respective nodes at a reference wavelength in the communication system so that communication wavelengths are stabilized in the respective nodes on the basis of the reference wavelength.

38. A method according to claim 30, wherein the requesting node selects a signal line, which is not occupied, on the basis of the state information when a line selecting right is given to the requesting node.

39. A communication method in a communication system in which a plurality of nodes are connected, by a plurality of signal lines and by a usage state transmission line on which information indicative of a usage state of the plurality of signal lines is transmitted, to perform communication, said method comprising the steps of:

forming an encoded pattern in which state information indicative of a current usage state of the plurality of signal lines; and transmitting the encoded pattern to each of the nodes over the usage state transmission line at a reference wavelength in the communication system so that communication wavelengths are stabilized in the respective nodes on the basis of the reference wavelength, wherein each of the nodes obtains the state information upon receiving the encoded pattern, and after a node requesting use of a signal line receives the encoded pattern, the requesting node selects an available signal line on the basis of the state information.

40. A method according to claim 39, wherein the communication system has a star type structure in which the signal lines and the usage state transmission line are respectively connected to a star coupler.

41. A method according to claim 40, wherein said transmitting step is performed by supplying the encoded pattern to the star coupler and distributing the encoded pattern to each of the nodes via the star coupler.

42. A method according to claim 39, wherein the encoded pattern is transmitted to the respective nodes at a clock frequency used in communication on the signal line.

43. A method according to claim 39, wherein said encoding step forms the encoded pattern to further encode information indicative of an activation state of the communication system.

44. A method according to claim 39, wherein said encoding step forms the encoded pattern to further encode an obstacle occurrence state in the communication system.

45. A method according to claim 39, wherein the plurality of signal lines and the usage state transmission line are multiplexed.

46. A method according to claim 39, wherein the plurality of signal lines and the usage state transmission line are wavelength-multiplexed.

47. A method according to claim 39, wherein the plurality of signal lines are wavelength-multiplexed and the encoded pattern is transmitted to the respective nodes at a reference wavelength in the communication system sot that communication wavelengths are stabilized in the respective nodes on the basis of the reference wavelength.

* * * * *

UNITED STATES PATENT AND TRADEMARK OFFICE
CERTIFICATE OF CORRECTION

PATENT NO. : 5,724,166
DATED : March 3, 1998
INVENTOR(S) : TORU NAKATA

It is certified that error appears in the above-identified patent and that said Letters Patent is hereby corrected as shown below:

On the title page:

AT [56] REFERENCES CITED

OTHER PUBLICATIONS

After Computer Comm., "passing" should read --passing access--.

COLUMN 10

Line 64, "liens" should read --lines--.

COLUMN 11

Line 19, "of" (first occurrence) should read --on--; and
Line 53, "odes" should read --nodes--.

COLUMN 12

Line 37, "of" (first occurrence) should read --on--.

COLUMN 14

Line 23, "sot" should read --so--.

Signed and Sealed this

Eighth Day of September, 1998

Attest:

BRUCE LEHMAN

Attesting Officer     Commissioner of Patents and Trademarks